(12) United States Patent
Jain et al.

(10) Patent No.: US 7,652,988 B2
(45) Date of Patent: Jan. 26, 2010

(54) HARDWARE-BASED RATE CONTROL FOR BURSTY TRAFFIC

(75) Inventors: Sanjay Jain, Saratoga, CA (US); Deepak Aatresh, Saratoga, CA (US); Daniel M. Hegglin, Danville, CA (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1111 days.

(21) Appl. No.: 10/446,419

(22) Filed: May 28, 2003

(65) Prior Publication Data

US 2003/0223370 A1    Dec. 4, 2003

Related U.S. Application Data

(60) Provisional application No. 60/385,978, filed on Jun. 4, 2002.

(51) Int. Cl.
    *H04L 12/26* (2006.01)
(52) U.S. Cl. .................... 370/230; 370/395.4
(58) Field of Classification Search ......... 370/229–240, 370/395.4–395.43
    See application file for complete search history.

(56) References Cited

U.S. PATENT DOCUMENTS

| | | | | |
|---|---|---|---|---|
| 5,029,164 A | * | 7/1991 | Goldstein et al. | 370/235 |
| 5,274,644 A | * | 12/1993 | Berger et al. | 370/230 |
| 5,381,407 A | * | 1/1995 | Chao | 370/233 |
| 5,751,964 A | * | 5/1998 | Ordanic et al. | 709/224 |
| 6,046,979 A | * | 4/2000 | Bauman | 370/229 |
| 6,771,599 B1 | * | 8/2004 | Aoyama et al. | 370/230 |
| 2002/0075895 A1 | | 6/2002 | Yamaguchi et al. | |
| 2002/0174216 A1 | | 11/2002 | Shorey et al. | |
| 2004/0066746 A1 | * | 4/2004 | Matsunaga | 370/235 |

FOREIGN PATENT DOCUMENTS

WO    WO 01/77851 A1    10/2001

OTHER PUBLICATIONS

Jamshid Mahdavi & Sally Floyd, TCP-Friendly Unicast Rate-Based Flow Control, Jan. 1997, 4 pgs.
Francois Toutain, TCP-friendly Point-to-point Video-like Source Rate Control, Mar. 24, 1999, 12 pgs.
Stefaan De Cnodder, Rate Adaptive Shapers for Data Traffic in DiffServ Networks, May 10-11, 2000, 6 pgs.

* cited by examiner

*Primary Examiner*—Kwang B. Yao
*Assistant Examiner*—Andrew Lai
(74) *Attorney, Agent, or Firm*—Wilson & Ham

(57) ABSTRACT

A hardware-based rate control engine is designed to allow credits to be accumulated over multiple time-slices up to a maximum credit limit. The rate control engine is also allowed to dispatch packets up to a maximum drain rate during each time-slice as long as sufficient credits are available. Allowing credits to accumulate over multiple time slices allows unused bandwidth to be saved during times of little or no traffic and used when the subsequent traffic bursts arrive. Additionally, limiting the maximum drain rate puts a cap on how fast the saved bandwidth can be consumed by subsequent traffic bursts. The rate control settings can be adapted in response to a characteristic, or characteristics, of the traffic flow. For example, one group of settings of a traffic flow can be used for bursty traffic, while a different group of settings can be used for smooth traffic.

29 Claims, 6 Drawing Sheets

HARDWARE-BASED RATE CONTROL FOR BURSTY TRAFFIC

CROSS-REFERENCE TO RELATED APPLICATION

This application is entitled to the benefit of provisional U.S. Patent Application Ser. No. 60/385,978, filed Jun. 4, 2002.

FIELD OF THE INVENTION

The invention relates to traffic control techniques in a packet-based switch/router, and more particularly, to techniques for controlling packet traffic using a hardware-based credit bucket rate controller.

BACKGROUND OF THE INVENTION

Typical hardware-based rate controllers use a credit scheme in which a fixed number of credits are allocated to a credit bucket at the beginning of each time interval. The rate at which credits are allocated to the credit bucket is defined by the refresh rate and the time interval. If credits are not consumed by packets during the current time interval, then the unused credits are lost and cannot be rolled over to a subsequent time interval. This is known as a "use-it or lose-it" credit scheme. Although use-it or lose-it credit schemes work well to ensure that packet traffic does not exceed the rate that is established by the refresh rate, use-it or lose-it credit schemes often do not work well for rate limiting bursty traffic, where rate limiting involves dropping packets that exceed a specific rate limit. Use-it or lose-it credit schemes do not work well for rate limiting bursty traffic because large bursts of packets often exceed the allocated credits in the current time interval, thereby causing some packets from the burst to be dropped for lack of sufficient credits. While some packets from the burst are dropped because the credits allocated in the current time interval are insufficient, credits in subsequent time intervals go unused during the periods between bursts. Dropping some of the packets from a burst is not a desirable solution to congestion problems.

Traffic that utilizes the Transmission Control Protocol (TCP) is bursty by design. Because TCP is such a widely used protocol for Internet traffic, it is important to be able to accommodate TCP traffic in a rate control scheme such as rate limiting. One feature of TCP traffic is that packets that do not reach their destination are retransmitted from the source. Therefore, any packets that are dropped during a rate control operation at an intermediate network node will be retransmitted from the source. The retransmitted packets consume additional bandwidth in the network and add delay to the packet transmission.

One way to minimize the retransmitting of dropped TCP packets is to buffer the packets before rate control is applied to the packets. Buffering the packets allows bursts of packets to be metered out as credits are allocated during subsequent time intervals without having to drop packets. This type of rate control is generally referred to as "rate shaping." A disadvantage to buffering packets is that buffer memory adds cost to a traffic control system. Additionally, the buffering is likely to add delay to the packets, which may be unacceptable in time-critical applications such as real-time voice and video applications.

Another disadvantage of typical hardware-based rate controllers is that the parameters of the rate control algorithms (e.g., the time interval and refresh rate) are typically set once and then left alone. This "set and forget" approach works well when the traffic pattern is stable, but, it may not work as well when the traffic pattern tends to be unpredictable.

In view of the desire to provide rate control in a packet-based network, what is needed is a hardware-based rate control technique that accommodates bursty traffic, that does not require dedicated buffer memory, and that is flexible enough to deal with different traffic patterns.

SUMMARY OF THE INVENTION

A hardware-based rate control engine is designed to allow credits to be accumulated over multiple time-slices up to a maximum credit limit. The rate control engine is also allowed to dispatch packets up to a maximum drain rate during each time-slice as long as sufficient credits are available. Allowing credits to accumulate over multiple time slices allows unused bandwidth to be saved during times of little or no traffic and used when the subsequent traffic bursts arrive. Additionally, limiting the maximum drain rate puts a cap on how fast the saved bandwidth can be consumed by subsequent traffic bursts.

The rate control settings of the rate control engine can be adapted in response to a characteristic, or characteristics, of the traffic flow. The adaptable rate control settings may include time-slice, refresh rate, maximum credit limit, and maximum drain rate values. One group of rate control settings of a traffic flow can be used for bursty traffic, while a different group of settings can be used for smooth traffic. In an embodiment, incoming traffic is characterized as bursty or smooth and the rate control settings are selected in response to the characterization.

Other aspects and advantages of the present invention will become apparent from the following detailed description, taken in conjunction with the accompanying drawings, illustrating by way of example the principles of the invention.

DETAILED DESCRIPTION

Figure 1:
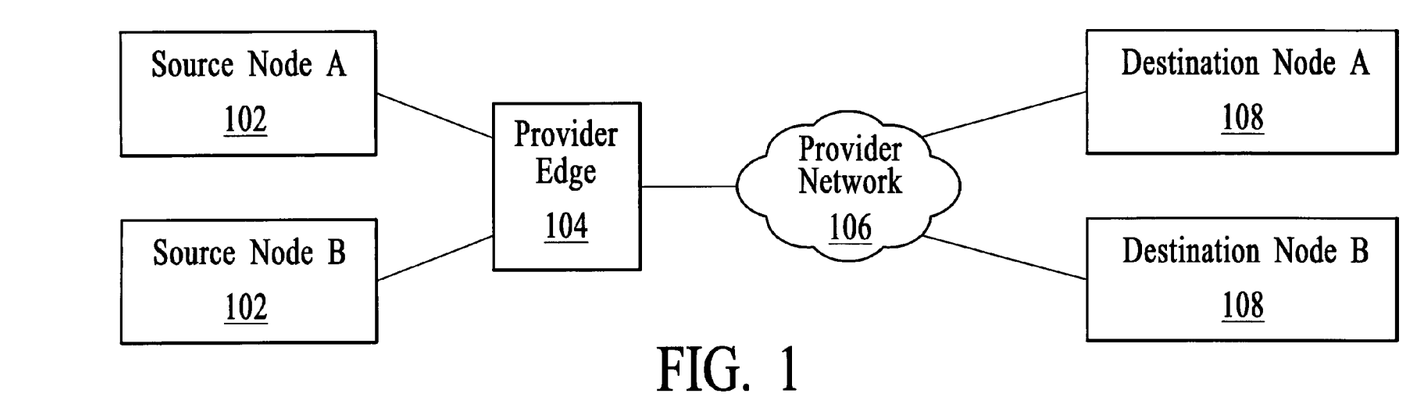
FIG. 1 depicts an example of a network that includes two source nodes (source node A and source node B), a provider edge, a provider network, and two destination nodes (destination node A and destination node B).

FIG. 1 depicts an example of a network 100 that includes two source nodes 102 (source node A and source node B), a provider edge node 104 (referred to herein as the provider edge), a provider network 106, and two destination nodes 108 (destination node A and destination node B). The source nodes transmit traffic to the provider edge. Examples of the traffic that is transmitted to the provider edge by the source nodes include any combination of layer 2 (L2), layer 3 (L3), and layer 4 traffic (L4), where the layers are defined by the International Organization for Standardization (ISO) in the open system interconnect (OSI) model. The source nodes may transmit many different types of traffic separately or simultaneously. Additionally, the traffic may have different flow characteristics. For example, some traffic may be bursty while other traffic may be smooth. Smooth traffic may be transmitted from a source node when the source is equipped with traffic shaping systems.

Traffic from the source nodes may include TCP traffic. TCP traffic is characteristically bursty. TCP provides reliability features that ensure the delivery of packet traffic. The reliability features include an acknowledgement protocol in which the receiver returns acknowledgement (ACK) messages in response to each packet as confirmation that the packet was received. If an ACK message is not received in a predetermined time period, then a "time-out" occurs and a copy of the packet is retransmitted.

In a TCP environment, a measure of the total traffic transmitted per unit of time is identified as "throughput." Throughput includes all packets that are transmitted through a measuring point, including identical packets that are retransmitted through the measuring point as a result of a timeout. A measure of only unique packets that are transmitted through a measuring point per unit of time is identified as "goodput." Goodput does not include packets that are retransmitted as a result of a timeout. That is, goodput is a measure of the unique traffic that is transmitted through a measuring point.

In an embodiment, the provider edge 104 is a packet-based switch/router, such as an Ethernet-based switch/router that forwards traffic using L2, L3, and L4 header information. The Ethernet-based switch/router may include line cards that support network protocols such as Ethernet, ATM, Frame Relay, and/or SONET. The provider edge connects the source nodes to the provider network and ultimately to the destination nodes. One aim of the provider edge is to provide a controlled traffic stream to the provider network because a controlled traffic stream is easier for the provider network to manage. In an embodiment, a controlled traffic stream is one that has a relatively stable traffic profile (i.e., a "smooth" traffic profile) whereas an uncontrolled traffic stream may have an erratic traffic profile that results from traffic bursts. Although the provider edge aims to provide a controlled traffic stream to the provider network, it often does not receive a controlled traffic stream from the source nodes.

The provider network 106 includes any type of network that can be used to connect the provider edge with the destination nodes 108. Typically, the provider network is a multi-node network that utilizes L2 switching and/or L3 routing.

The destination nodes 108 are connected to the provider network 106 to receive traffic from the source nodes 102. The source nodes support TCP, which includes returning ACK messages in response to TCP packets.

Figure 2:
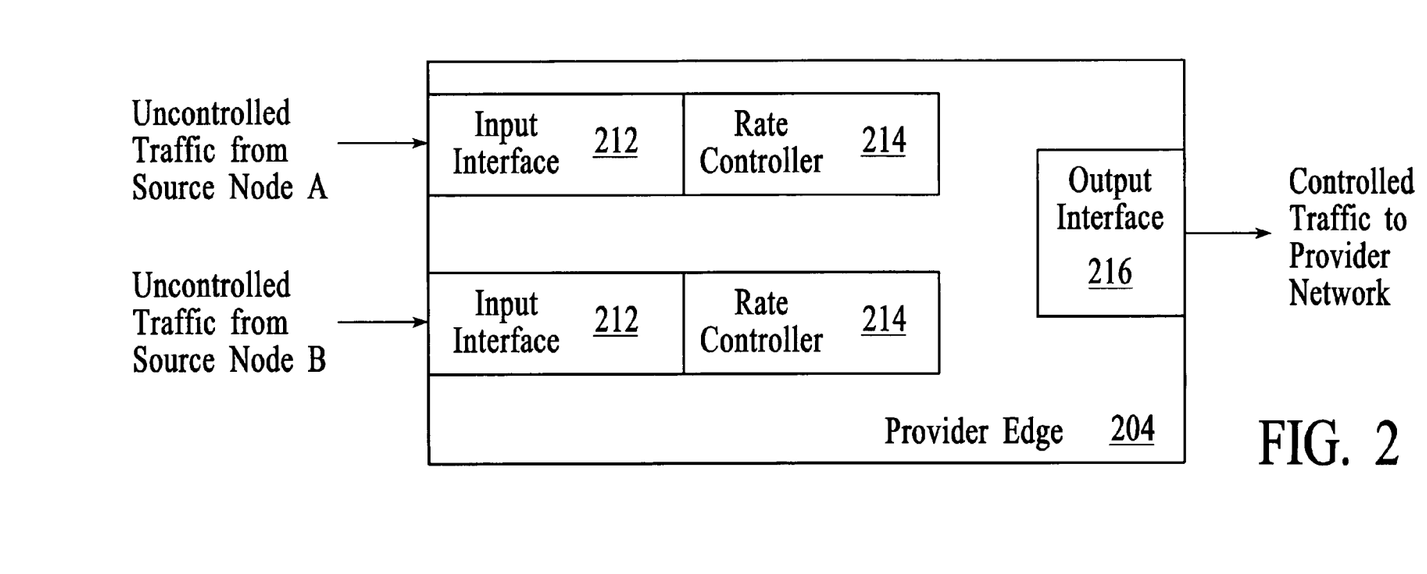
FIG. 2 depicts an expanded view of an embodiment of the provider edge depicted in FIG. 1.

FIG. 2 depicts an expanded view of an embodiment of the provider edge 104 depicted in FIG. 1. The provider edge 204 depicted in FIG. 2 includes input interfaces 212, rate controllers 214, and an output interface 216. The input interfaces provide the interface between the source nodes and the provider edge and the output interface provides the interface between the provider edge and the provider network. The input interfaces receive uncontrolled traffic from the source nodes and the output interfaces transmit controlled traffic to the provider network. The rate controllers control the rate of incoming packet traffic to enable a controlled traffic stream to be transmitted to the provider network. In an embodiment, the rate controllers implement hardware-based rate limiting as is described in more detail below. Rate limiting is a rate control technique that does not include packet buffering, whereby packets that exceed a specified rate limit are dropped or marked. When rate limiting is applied to bursty traffic, often times the result is to drop packets from the tail end of a burst. When the bursty traffic is TCP traffic, the dropping of packets results in packet retransmissions and ultimately in lower goodput. In accordance with an embodiment of the invention, hardware-based rate limiting is implemented in a manner that accommodates bursty traffic without using packet buffers.

In accordance with an embodiment of the invention, a hardware-based rate control engine is designed to allow credits to be accumulated over multiple time-slices up to a maximum credit limit. The rate control engine is also allowed to dispatch packets up to a maximum drain rate during each time-slice as long as sufficient credits are available. Allowing credits to accumulate over multiple time slices allows unused bandwidth to be saved during times of little or no traffic and used when the subsequent traffic bursts arrive. Additionally, limiting the maximum drain rate puts a cap on how fast the saved bandwidth can be consumed by subsequent traffic bursts.

Figure 3:
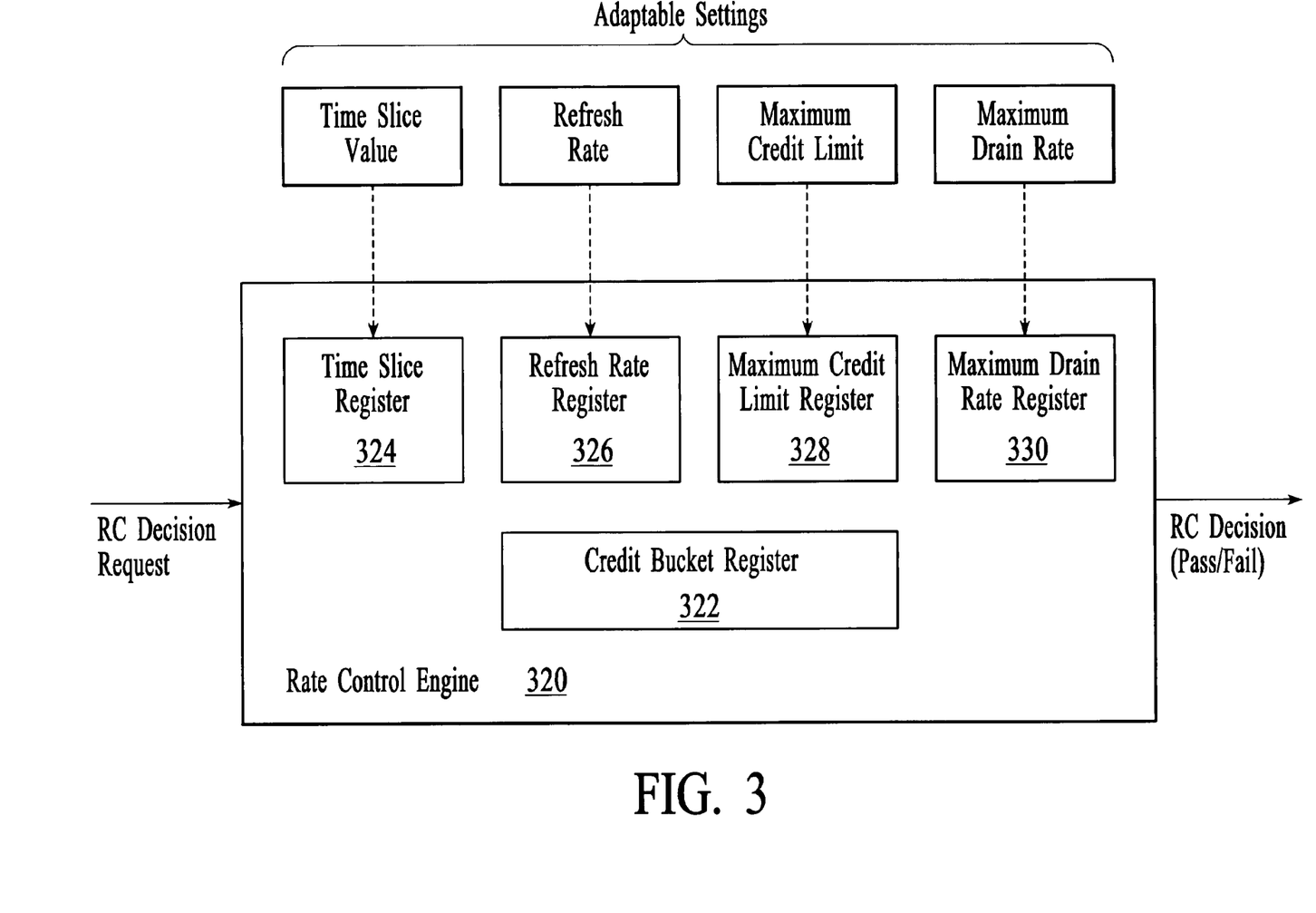
FIG. 3 depicts an embodiment of a hardware-based rate control engine that is used to implement rate limiting in a manner that accommodates bursty traffic without using packet buffers in accordance with an embodiment of the invention.

FIG. 3 depicts an embodiment of a hardware-based rate control engine 320 that is used to implement rate limiting in a manner that accommodates bursty traffic without using packet buffers. The rate control engine includes a credit bucket register 322, a time-slice register 324, a refresh rate register 326, a maximum credit limit register 328, and a maximum drain rate register 330. The credit bucket register holds a credit bucket value that is used to implement rate limiting.

The time-slice register 324 holds a value that is a measure of a time interval. For example, the time-slice value may represent a time interval of 2.5 milliseconds. Typically, the time-slice value is identified as a number of clock cycles of a system clock.

The refresh rate register 326 holds a value that identifies how many credits are added to the credit bucket per unit of time. In an embodiment, each credit represents a number of bytes, for example 256 bytes. Typically, the credits are added to the credit bucket at the beginning of each time-slice. Alternatively, the credit refresh rate may be a function of some other time interval The maximum credit limit register 328 holds a value that identifies the maximum number of credits that are allowed to accumulate in the credit bucket at any point in time. Credits are not allowed to accumulate in the credit bucket beyond the maximum credit limit. Any credits that are allocated beyond the maximum credit limit are dropped and cannot be recovered. The maximum credit limit ensures that the credit bucket does not grow beyond the established credit limit during times of little or no traffic. Typically, the maximum credit limit is a balance between providing the maximum amount of bandwidth accumulation without causing undesired traffic flow characteristics.

The maximum drain rate register 330 holds a value that identifies the maximum rate at which packets are allowed to pass through the rate control engine 320. The maximum drain rate is typically a measure of a number of credits per time-slice, where the number of credits translates to a number of bytes. The maximum drain rate should be larger than the refresh rate. In an embodiment, the maximum drain rate is on the order of 16 times the refresh rate. Typically, the maximum drain rate is a balance between providing the maximum amount of bandwidth to the traffic without choking off other traffic flows and without causing undesired traffic bursts at the output interface.

In operation, the rate control engine 320 receives a rate control decision request related to a particular packet as an input and generates a rate control decision as an output. The rate control decision is made using a particular group of control settings and the credit bucket. Initially, the credit bucket and control setting registers 322, 324, 326, 328, and 330 are set to default values. In an embodiment, the control settings for a particular packet are updated in response to a class-specific timestamp. For example, a timestamp indicating the time of the last control settings access is stored with a group of control settings. Upon accessing the group of control settings, the stored timestamp is compared with a current timestamp. If the current timestamp and the stored timestamp are the same, then the process is still the same time-slice and the group of control settings has already been updated. However, if the current timestamp and stored timestamp are different, then the process is at the beginning of a new time-slice and the group of control settings is updated accordingly. Updating a group of control settings includes updating the stored timestamp value to the current timestamp value. Alternatively, the credit bucket for a class of packets is updated at the beginning of each time-slice.

The credit bucket is allowed to increase up to the maximum credit limit as indicated by the maximum credit limit register. A rate control decision is made based on the number of credits in the credit bucket. In an embodiment, the rate control decision is either a pass or a fail. In one embodiment, to receive a passing rate control decision, the credit bucket must exceed an equivalent credit value of the packet. For example, the credit bucket must have at least 500 bytes worth of credits to issue a passing rate control decision for a 500 byte packet. In another embodiment, the credit bucket must simply exceed a credit threshold (e.g., the credit bucket must have a positive value) to issue a passing rate control decision for a packet. A passing rate control decision allows the respective packet to be forwarded and a failing rate control decision causes the respective packet to be dropped or marked. Once a packet is forwarded in response to a passing rate control decision, an equivalent credit value is deducted from the credit bucket. Packets can continue to be forwarded as long as the credit bucket has sufficient credits and as long as the maximum drain rate is not exceeded. In an embodiment, the current drain rate is calculated on a per time-slice basis and if the current drain rate exceeds the maximum drain rate, then subsequent packets are not given a passing rate control decision even if there are sufficient credits in the credit bucket.

The above-described rate control engine 320 works well for bursty traffic because the accumulation of credits over multiple time-slices allows credits to be saved during times of no traffic and used during traffic bursts. This saving of credits reduces the occurrence of dropped packets and consequently reduces the occurrence of packet retransmits in a TCP environment. In addition, because credits are only allocated at the refresh rate, over an extended period of time, bursty traffic will not exceed the rate allowed by the refresh rate. That is, although bursts of up to the maximum drain rate are allowed, the overall rate of the controlled traffic over time (e.g., over multiple time-slices) continues to be limited by the refresh rate.

Figure 4:
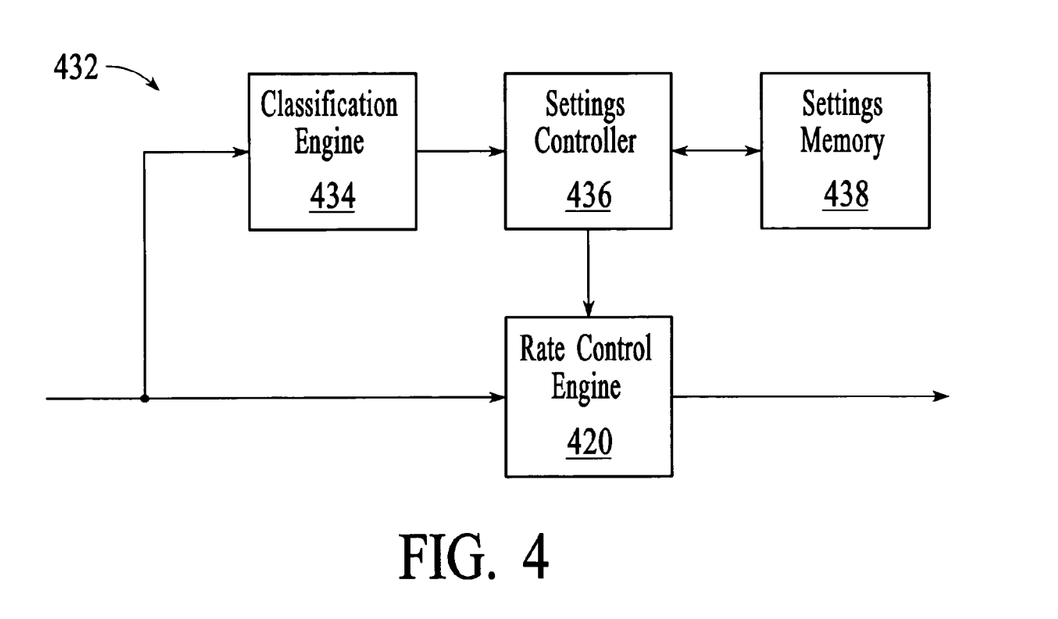
FIG. 4 depicts a rate control system in which the rate control engine of FIG. 3 can be implemented in accordance with an embodiment of the invention.

FIG. 4 depicts a system 432 in which the rate control engine of FIG. 3 can be implemented. The system includes a rate control engine 420, a classification engine 434, a settings controller 436, and a settings memory 438. The rate control engine is the same as the rate control engine depicted in FIG. 3. The rate control engine is connected to receive rate control settings from the settings controller.

The classification engine 434 classifies incoming packets based on packet-specific information. For example, the classification engine reads header information from each packet to determine the traffic class. The traffic class can be a function of such packet characteristics as input and/or output port, source and/or destination media access control (MAC) address, source and/or destination Internet protocol (IP) address, source and/or destination socket number, virtual circuit (VC) identifier (ID), virtual local area network (VLAN) ID, Ethernet type etc. The term "traffic class" is used loosely herein to identify packets with common attributes.

The settings controller 436 is connected to receive packet classification information from the classification engine 434 and to obtain rate control settings from the settings memory 438. In an embodiment, the settings controller selects the setting values in response to the traffic class. For example, one group of settings is applied for a first traffic class while a different group of settings is applied to a second traffic class.

The settings memory 438 stores rate control setting values. For example, the settings memory stores pre-established time-slice, refresh rate, maximum credit limit, and maximum drain rate values. The time-slice, refresh rate, maximum credit limit, and maximum drain rate values may be stored in groups, or sets, that include a combination of two or more of the different parameters. For example, a group of settings may include a refresh rate, a maximum credit limit, and a maximum drain rate value. The group of settings may be stored in the settings memory such that the entire group of settings can be accessed in the memory by simply identifying the group. The setting values may be stored on a per-class basis so that class-specific settings can be selected in response to packet classification information.

Figure 5:
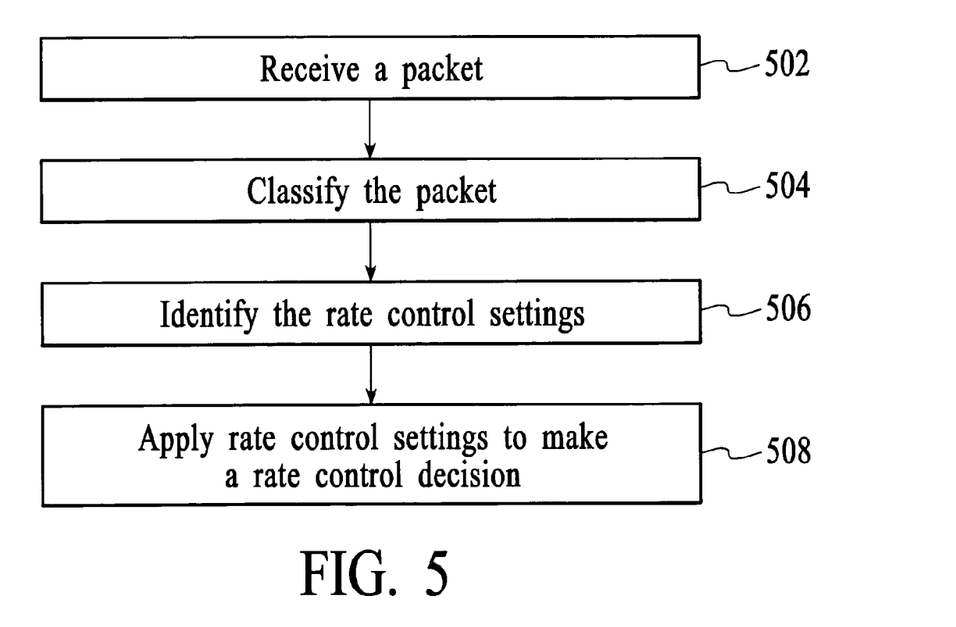
FIG. 5 depicts a process flow diagram of a rate control method in accordance with an embodiment of the invention that corresponds to the system of FIG. 4.

FIG. 5 depicts a process flow diagram of a rate control method that corresponds to the system of FIG. 4. At step 502, a packet is received. At step 504, the packet is classified. For example, the packet is classified by the classification engine of FIG. 4. At step 506, rate control settings are identified for the packet. For example, the rate control settings may be identified by the settings controller. The identified rate control settings are then written to the rate control engine of FIG. 4 and may be held in local memory within the rate control engine for use with subsequent rate control decisions for the same traffic class. At step 508, the rate control settings are applied to make a rate control decision. For example, the rate control decision (either pass of fail) is made by the rate control engine of FIG. 4.

All of the above-described control settings (time slice, refresh rate, maximum credit limit, and maximum drain rate) for the rate control engine 320 and 420 are adjustable and can be changed in response to changes in the traffic. The rate control settings can be changed individually or as a group. For example, unique groups of settings can be established for different traffic classes and/or traffic flow characteristics and then changed as a group in response to changes in the traffic. In contrast, typical hardware-based credit bucket implementations write the control settings to hardware registers once and forget about the settings. This "set and forget" approach does not provide the flexibility needed to deal with changing traffic conditions.

While certain settings of the time-slice, refresh rate, maximum credit limit, and maximum drain rate values provide good performance results for one type of traffic flow (e.g., a bursty traffic flow), the same group of settings may not provide the same performance results for another type of traffic flow (e.g., a smooth, or "non-bursty" traffic flow). Because the same settings may not provide the same performance results for different types of traffic flow, in accordance with an embodiment of the invention, the rate control settings can be adapted in response to a characteristic, or characteristics, of the traffic flow. For example, one group of settings of a traffic flow can be used for bursty traffic, while a different group of settings can be used for smooth traffic.

Figure 6:
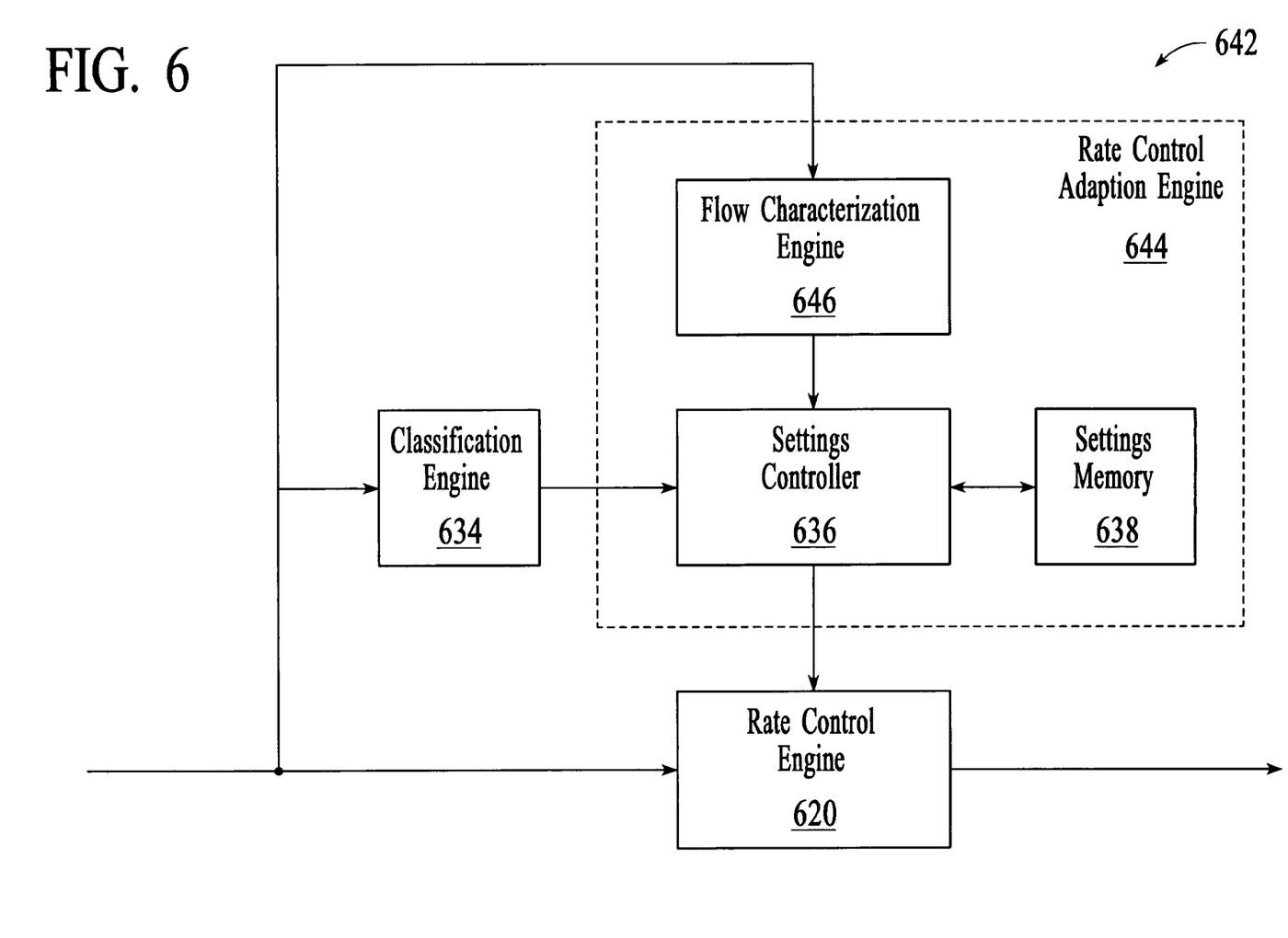
FIG. 6 depicts a rate control system that enables the rate control settings of a rate control engine to be adapted in response to flow characteristics of incoming traffic in accordance with an embodiment of the invention.

FIG. 6 depicts a system 642 that enables the rate control settings of a rate control engine to be adapted in response to flow characteristics of incoming traffic. The system includes a rate control engine 620, a classification engine 634, and a rate control adaption engine 644. The rate control engine and the classification engine are similar to the rate control engine 420 and the classification engine 434 described above with reference to FIG. 4. The rate control adaption engine provides the ability to adapt the rate control settings in response to traffic flow characteristics. In the embodiment of FIG. 6, the rate control adaption engine includes a flow characterization engine 646, a settings controller 636, and a settings memory 638, where the settings controller and settings memory are similar to the settings controller 436 and settings memory 438 described above with reference to FIG. 4. The operation of the system of FIG. 6 is similar to the operation of the system of FIG. 4 except that the rate control settings are adapted in response to a characterization of a traffic flow.

In operation, the flow of an incoming stream of packets is characterized and the characterization is used to determine which rate control settings should be used for the rate control decision. In the embodiment of FIG. 6, the flow characterization is done on a class-by-class basis. That is, the flow characterization for each individual class of traffic is done separately. For example, separate flow characterizations are done for a flow of TCP packets from source node A to destination node A and for a flow of TCP packets from source node B to destination node B. In accordance with an embodiment of the invention, the flow characterization distinguishes between traffic that is bursty and traffic that is "non-bursty" or smooth. This distinction is made because better performance results are achieved when the rate control settings are tailored to the two different flow characteristics. That is, better performance is achieved when the rate control settings are tuned for either bursty or smooth traffic. The techniques used to determine whether traffic is bursty or smooth are implementation specific. One example technique for determining whether traffic is bursty or smooth is described below with reference to FIG. 8.

Figure 7:
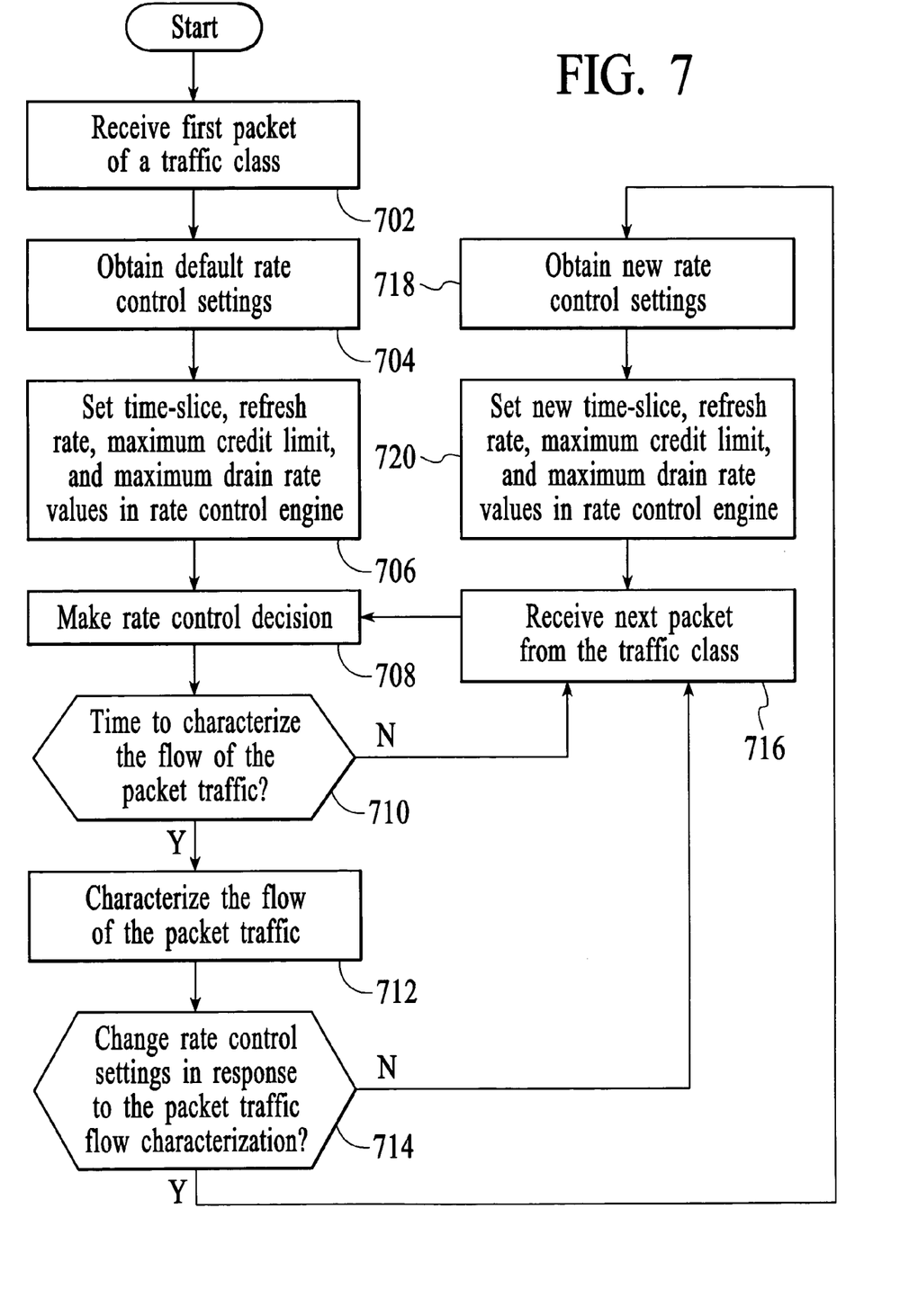
FIG. 7 depicts a process flow diagram of an example method that involves adapting rate control settings in response to traffic flow characterizations in accordance with an embodiment of the invention.

It is not necessary to characterize a traffic flow on a packet-by-packet basis. In an embodiment, traffic is characterized on a periodic basis, for example, once per hour. FIG. 7 depicts a process flow diagram of an example method that involves adapting rate control settings in response to traffic flow characterizations. At step 702, a first packet of a particular traffic class is received. At step 704, the default rate control settings are obtained for packets of that traffic class. At step 706, values for the time-slice, refresh rate, maximum credit limit, and the maximum drain rate are set in the rate control engine. At step 708, a rate control decision is made for the packet using the default rate control settings. In an embodiment, making the rate control decision includes the tasks of refreshing and updating the credit bucket. At decision point 710, it is determined whether it is time to characterize the flow of packet traffic. If it is not time to characterize the flow of packet traffic, then the process proceeds to step 716, where a next packet from the traffic class is received. If it is time to characterize the flow of packet traffic, then at step 712, the flow of packet traffic is characterized. At decision point 714, it is determined if the rate control settings should be changed in response to the flow characterization. If the rate control settings are not to be changed, then the process proceeds to step 716, where a next packet from the traffic class is received. If the rate control settings are to be changed, then the process proceeds to step 718, where new rate control settings are obtained. At step 720, the new rate control settings are set in the rate control engine and at step 716, a next packet is received from the traffic class. At step 708, a rate control decision is made using the new rate control settings.

In an embodiment, traffic can be characterized by taking multiple samples of the traffic during a characterization session. For example, 5 samples of 500 ms are taken during a characterization session. In an embodiment, the samples count the number of packets received during the interval and the number of packets is multiplied by an estimated packet size to get the total number of bytes per sample interval. The total number of bytes per sample interval can be divided by the sample interval or used in raw form to identify traffic rates. In an embodiment, traffic is characterized as bursty if the actual rate of the traffic (i.e., the sampled rate) exceeds the established refresh rate of the traffic by an established threshold. For example, a flow can be characterized as bursty if the actual rate exceeds the refresh rate by a factor of three. Alternatively, traffic is characterized as bursty if the deviation between the rates of two samples exceeds a pre-established threshold. For example, two rate samples are taken and actual rates are calculated. The two actual rates are compared and the deviation between the two rates is determined. The deviation is then compared to a deviation threshold and if the deviation exceeds the deviation threshold, then the traffic is characterized as bursty. For example, a deviation threshold of five percent may be used to distinguish bursty traffic from smooth traffic.

Figure 8:
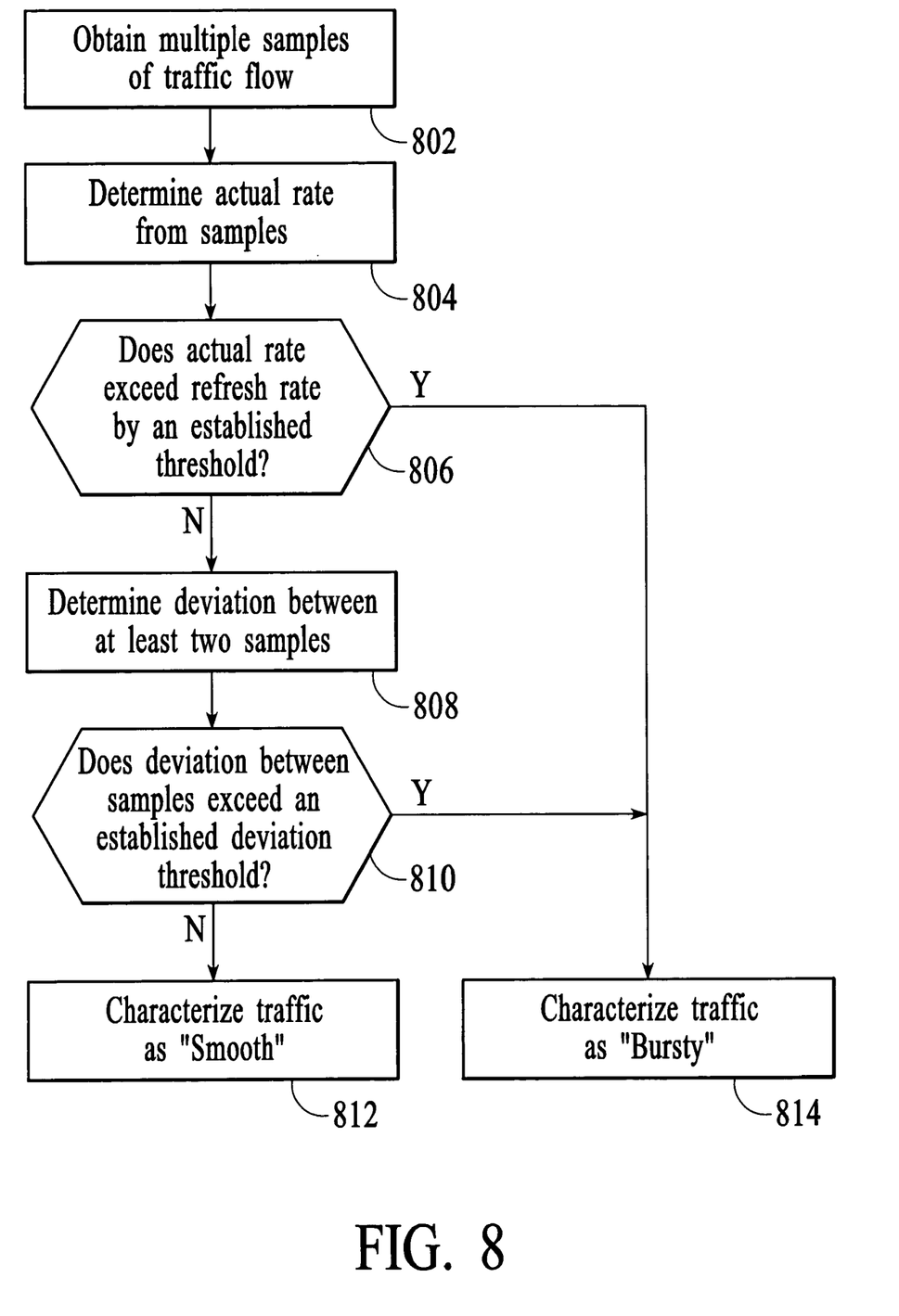
FIG. 8 depicts a process flow diagram of a method for determining whether a traffic flow is bursty or smooth in accordance with an embodiment of the invention.

In an embodiment, traffic is characterized as bursty if either one of the above-identified conditions is met. FIG. 8 depicts a process flow diagram of a method for determining whether a traffic flow is bursty or smooth. At step 802, multiple samples of a traffic flow are obtained. At step 804, actual rates are determined from the samples. At decision point 806, it is determined whether the actual rate exceeds the refresh rate by an established threshold. If the actual rate exceeds the refresh rate by the established threshold, then at step 814, the traffic is characterized as bursty. If the actual rate does not exceed the refresh rate by the established threshold, then at step 808, the deviation between the actual rate of at least two samples if determined. At decision point 810, it is determined whether the deviation between samples exceeds an established threshold. If the deviation exceeds the established threshold, then, at step 814, the traffic is characterized as bursty. If the deviation does not exceed the established threshold, then, at step 812, the traffic is characterized as smooth.

Although specific embodiments of the invention have been described and illustrated, the invention is not to be limited to the specific forms or arrangements of parts as described and illustrated herein. The invention is limited only by the claims.

What is claimed is:

1. A method for controlling packet traffic using a hardware-based rate control engine comprising:
    establishing a refresh rate that represents a number of credits that are allocated to a credit bucket in a time-slice;
    establishing a maximum credit limit that represents the maximum number of credits that can be accumulated in said credit bucket;
    establishing a maximum drain rate that represents the maximum number of credits that can be drained from said credit bucket in a single time-slice;
    setting said refresh rate, said maximum credit limit, and said maximum drain rate in registers of a hardware-based rate control engine;
    allowing credits to accumulate in said credit bucket over multiple time-slices up to a maximum of said maximum credit limit;
    allocating credits from the credit bucket to packet traffic that is associated with said credit bucket;
    restricting the allocation of credits from said credit bucket in any single time-slice to the maximum drain rate;
    characterizing the flow of packet traffic that is associated with said credit bucket; and
    changing the maximum credit limit and the maximum drain rate as a set in response to said characterization.

2. The method of claim 1 wherein the flow of said packet traffic is characterized as either bursty or smooth.

3. The method of claim 2 further including changing at least one of said refresh rate, said maximum credit limit, and said maximum drain limit depending on whether said packet traffic is characterized as bursty or smooth.

4. The method of claim 1 wherein characterizing said packet traffic further includes obtaining multiple samples of said packet traffic.

5. The method of claim 4 wherein characterizing said packet traffic includes:
    determining an actual rate of said packet traffic from said multiple samples; and
    identifying said packet traffic as bursty if said actual rate exceeds said refresh rate by an established threshold.

6. The method of claim 4 wherein characterizing said packet traffic includes:
    determining actual rates of said packet traffic from each of said multiple samples;
    determining a deviation between said actual rates of said packet traffic; and
    identifying said traffic flow as bursty if said deviation between said actual rates exceeds a deviation threshold.

7. The method of claim 1 farther including automatically changing said refresh rate, said maximum credit limit, and said maximum drain rate as an entire set in response to said characterization.

8. The method of claim 7 further including selecting a set of a refresh rate, a maximum credit limit, and a maximum drain rate from a memory and writing said set into respective registers of said hardware-based rate control engine.

9. The method of claim 1 further including:
    classifying each packet of said packet traffic; and
    applying class-specific rate control to said packet traffic.

10. The method of claim 9 further including setting class-specific refresh rates, maximum credit limits, and maximum drain rates in registers of said hardware-based rate control engine.

11. The method of claim 10 further including characterizing the flow of said packet traffic on a class-specific basis and changing said class-specific refresh rates, maximum credit limits, and maximum drain rates in response to said class-specific characterizations.

12. A system for controlling packet traffic comprising:
    a credit bucket;
    a rate control engine;
    a settings controller connected to said rate control engine;
    a characterization engine coupled to the settings controller, the characterization engine configured to characterize the flow of packet traffic that is associated with the credit bucket and to communicate said characterization to the settings controller; and
    a settings memory connected to provide rate control settings to said rate control engine;
    wherein:
    said settings controller is configured to provide said rate control engine with a refresh rate, a maximum credit limit, and a maximum drain rate from said settings memory, and to change the maximum credit limit and the maximum drain rate as a set in response to said characterization of said traffic flow from said characterization engine; and
    said rate control engine being configured to:
        allow credits to accumulate in the credit bucket at said refresh rate over multiple time-slices up to a maximum of said maximum credit limit;
        allocate credits from the credit bucket to packet traffic that is associated with said credit bucket; and
        restrict the allocation of credits from said credit bucket in any single time-slice to the maximum drain rate.

13. The system of claim 12 wherein said flow characterization engine characterizes the flow of said packet traffic as either bursty or smooth.

14. The system of claim 13 wherein said settings controller includes logic for causing the change of at least one of said refresh rate, said maximum credit limit, and said maximum drain limit depending on whether said packet traffic is bursty or smooth.

15. The system of claim 12 wherein said flow characterization engine is configured to obtain multiple samples of said packet traffic.

16. The system of claim 15 wherein said flow characterization engine is configured to:
    determine an actual rate of said packet traffic from said multiple samples; and
    identify said packet traffic as bursty if said actual rate exceeds said refresh rate by an established threshold.

17. The system of claim 15 wherein said flow characterization engine is configured to:
    determine actual rates of said packet traffic from each of said multiple samples;
    determine a deviation between said actual rates of said packet traffic; and
    identify said traffic flow as bursty if said deviation between said actual rates exceeds a deviation threshold.

18. The system of claim 12 wherein said settings controller is configured to automatically change said refresh rate, said maximum credit limit, and said maximum drain rate as an entire set in response to said characterization of said traffic flow from said traffic characterization engine.

19. The system of claim 12 wherein said settings controller is configured to select a set of a refresh rate, a maximum credit limit, and a maximum drain rate from said settings memory.

20. The system of claim 12 further including a classification engine configured to classify each packet of said packet traffic, and wherein said rate control engine and said settings controller are configured to apply class-specific rate control to said packet traffic.

21. The system of claim 20 wherein said settings controller is configured to set class-specific refresh rates, maximum credit limits, and maximum drain rates in registers of said rate control engine.

22. The system of claim 21 further including a traffic characterization engine configured to characterize the flow of packet traffic that is associated with said credit bucket and to communicate said characterization to said settings controller and wherein said settings controller is configured to change said class-specific refresh rates, maximum credit limits, and maximum drain rates in response to said class-specific characterization.

23. The system of claim 22 wherein said settings controller is configured to change at least one of said class-specific refresh rates, maximum credit limits, and maximum drain rates depending on whether traffic is bursty or smooth.

24. A rate-limiting system comprising:
   a rate control engine configured to;
      allow credits to accumulate in a credit bucket at a refresh rate over multiple time-slices up to a maximum credit limit;
      allocate credits from said credit bucket to packet traffic that is associated with said credit bucket; and
      restrict the allocation of credits from said credit bucket in any single time-slice to a maximum drain rate; and
   a rate control adaption engine configured to characterize traffic, to select at least one of said refresh rate, said maximum credit limit, and said maximum drain rate in response to said traffic characterization, and to adapt the maximum credit limit and the maximum drain rate as a set in response to said characterization of said traffic flow from said traffic characterization engine.

25. The system of claim 24 wherein said rate control adaption engine characterizes the flow of said packet traffic as either bursty or smooth.

26. The system of claim 25 wherein said rate control adaption engine includes logic for causing the change of at least one of said refresh rate, said maximum credit limit, and said maximum drain limit depending on whether said packet traffic is characterized as bursty or smooth.

27. The system of claim 25 wherein said rate control adaption engine is configured to obtain multiple samples of said packet traffic.

28. The system of claim 27 wherein said rate control adaption engine is configured to:
   determine an actual rate of said packet traffic from said multiple samples; and
   identify said packet traffic as bursty if said actual rate exceeds said refresh rate by an established threshold.

29. The system of claim 28 wherein said rate control adaption engine is configured to:
   determine actual rates of said packet traffic from each of said multiple samples;
   determine a deviation between said actual rates of said packet traffic; and
   identify said traffic flow as bursty if said deviation between said actual rates exceeds a deviation threshold.

* * * * *

UNITED STATES PATENT AND TRADEMARK OFFICE
CERTIFICATE OF CORRECTION

PATENT NO. : 7,652,988 B2 Page 1 of 1
APPLICATION NO. : 10/446419
DATED : January 26, 2010
INVENTOR(S) : Jain et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1779 days.

Signed and Sealed this

Twenty-eighth Day of December, 2010

David J. Kappos
*Director of the United States Patent and Trademark Office*